Patented July 7, 1942

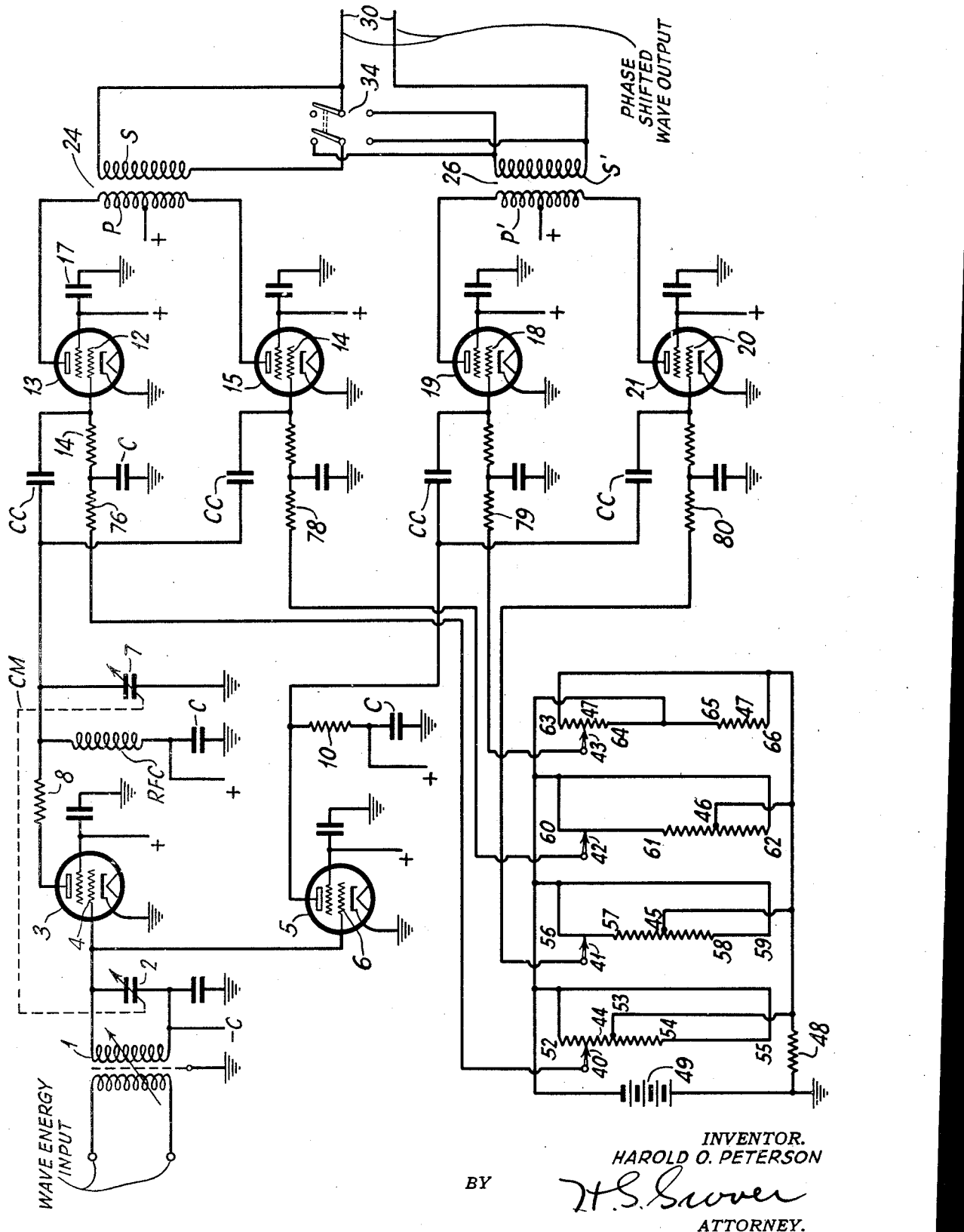

2,288,740

UNITED STATES PATENT OFFICE 2,288,740

PHASE ADJUSTER

Harold O. Peterson, Riverhead, N. Y., assignor to Radio Corporation of America, a corporation of Delaware Application October 20, 1938, Serial No. 236,027

5 Claims. (Cl. 172—238)

This application concerns a new and improved method of and means for adjusting the phase of wave energy.

In the past, phase adjusters have been of two general types in which the output of variable phase was derived either by adjusting an inductance or a capacity. In the device herein described phase adjustment of wave energy through a range of 360 degrees is accomplished by the control of the bias of vacuum tubes.

In describing my invention in detail reference will be made to the attached drawing wherein is shown diagrammatically an embodiment of my new and improved phase adjuster.

The operation of this device will be readily understood from the accompanying diagram. The incoming wave energy which may be of any type or frequency appears in tuned circuit 1—2, from which it is supplied to the grids 4 and 6 of vacuum tubes 3 and 5 co-phasially. The output of vacuum tube 3 appears across condenser 7 and is consequently rotated 90 degrees in phase with respect to the voltage at grid 4. The output of vacuum tube 5 appears across a resistance load 10 and has a phase substantially the same as the phase on the grid 6 and consequently has a phase practically 90 degrees from the phase of the voltage appearing across condenser 7. Since this device is designed to cover a considerable band of frequency, condenser 7 is adjustable in such a manner that the magnitude of the voltage across condenser 7 is, for all frequencies, substantially the same as the magnitude of the voltage appearing across resistance load 10. The value of condenser 7 can be adjusted through the same control mechanism CM used for the adjustment of condenser 2, and if necessary the plates of condenser 7 or of condenser 2 can be so shaped that the proper relationship exists between operating frequency, that is, the resonance frequency of the circuit formed by inductance 1 and condenser 2 and the capacitance of condenser 7.

The voltage across condenser 7 is impressed co-phasially upon the grids 12 and 14 of vacuum tubes 13 and 15 and the voltage across resistance 10 is impressed co-phasially upon the grids 18 and 20 of vacuum tubes 19 and 21. The output of vacuum tubes 13 and 15 is induced into a secondary circuit S of a transformer 24 from a split primary circuit P. Similarly the output of tubes 19 and 21 is induced from a split primary P' of a transformer 26 into its secondary S'. With respect to the secondary circuit of transformer 24, the voltage induced by current in the plate circuit of vacuum tube 13 will be 180 degrees from the phase of the voltage induced by current in the plate circuit of vacuum tube 15. A similar relationship exists in transformer 26 and vacuum tubes 19 and 21. Moreover, the phases of the voltages induced in S by tubes 13 and 15 are displaced about 90 degrees relative to the phase of the voltages induced in S' by tubes 19 and 21.

The transconductances of vacuum tubes 13, 15, 19 and 21 are controlled in such a manner as to give the desired phase relationship for the resultant voltage appearing at the output 30 which is a combination of the secondary voltages of transformers 24 and 26 which may be connected either in series or in parallel by switch 34.

One way in which the relative transconductances of these four tubes may be controlled is shown in the diagram wherein four blades may be simultaneously adjusted on four potentiometers. These four simultaneously adjusted potentiometer output blades are represented at 40, 41, 42 and 43 of the circuit diagram. The four potentiometers may, for instance, be arranged on complete circles of 360 degrees so that the output blades can be rotated around continuously in either direction. Thus, for instance, the potentiometer corresponding to output blade 40 would extend continuously around the circumference of a circle in which the distance from 52 to 53 is 90 degrees; from 53 to 54, 90 degrees; and from 54 to 55, 180 degrees. Likewise, from 56 to 57 is 90 degrees; 57 to 45, 90 degrees; 45 to 58, 90 degrees; 58 to 59, 90 degrees. From 60 to 61 is 180 degrees; from 61 to 46 is 90 degrees; and from 46 to 62 is 90 degrees. From 63 to 64 is 90 degrees; 64 to 65 is 180 degrees; and 65 to 66 is 90 degrees.

It will be noted that as blade 40 is advanced toward midpoint 53, the grid bias of vacuum tube 13 becomes less negative and therefore the transconductance of this tube increases to a maximum at 53 and then as it is further advanced it will decrease to a minimum at 54 which minimum will be maintained for the remainder of the distance 54 to 55. A similar action takes place in the other three potentiometers.

It will also be noted that for 180 degrees of rotation on any one of the potentiometers, the transconductance of the corresponding vacuum tube will be held at its minimum value. Thus for any adjustment of the four blades 40, 41, 42, 43, substantial output is being derived from only two of the four output tubes one of which will be either vacuum tube 13 or 15 and the other will be either vacuum tube 19 or 21. Thus it will be obvious to one familiar with the art that the phase of the resultant appearing in the output can be adjusted to any value of phase throughout a complete range of 360 degrees. By proper shaping of the resistance elements of the potentiometers, the amplitude of the output voltage can be made substantially constant irrespective of phase adjustment and it can be arranged to have the phase angle correspond to definite settings of the control arms 40, 41, 42 and 43.

By continuously rotating the control blades 40, 41, 42 and 43 an output of a different frequency can be produced.

Instead of mechanical control of the voltage applied to grids of tubes 13, 15, 19 and 21, vacuum tube modulators could be used thus making it possible to use this type of circuit for either phase modulation or frequency modulation.

Plate voltage is applied to vacuum tube 3 through a high frequency choke coil RFC which may have a high value of capacitive reactance for the frequencies at which the device is operated. A series resistance 8 is indicated in the plate circuit of vacuum tube 3 but this resistance may be left out of the circuit without changing the theory of operation. Condensers C are radio frequency by-pass condensers. Condensers CC are coupling condensers. Resistance 76 is a series impedance which will help smooth out the control voltage applied to vacuum tube 13. Resistances 78, 79 and 80 serve the same purpose for tubes 15, 19 and 21.

I claim:

1. In a system for producing alternating voltage of a substantially fixed phase which may be adjusted through a range of 360 degrees, pairs of electron discharge devices each having input electrodes and output electrodes, means for impressing alternating current of a first phase on the input electrodes of a first pair of said devices, means for impressing alternating current of a second and different phase on the input electrodes of a second pair of said devices, an output circuit combining the output currents of the devices of said first pair of devices in phase opposition, an output circuit combining the output currents of the devices of said second pair of devices in phase opposition, a combining circuit coupled to both of said output circuits, direct current circuit means connected with a control electrode in each of said devices, direct current potential adjusting means in each circuit for adjusting the transconductance of each device of said first and second pairs of devices, and a uni-control means common to all of said adjusting means for relating said adjusting means so that the square of the difference between the transconductances of the devices of said first pair of devices plus the square of the difference between the transconductances of the devices of said second pair of devices is a constant whereby voltages of the desired phase and of an amplitude which is substantially constant for all phases may be obtained in said combining circuit by manipulation of said uni-control means.

2. In a system for producing alternating voltage of a substantially fixed phase which may be adjusted through a range of 360 degrees, pairs of electron discharge devices each having input electrodes and output electrodes, means for impressing alternating current of a first phase on the input electrodes of a first pair of said devices, means for impressing alternating current of a second and different phase on the input electrodes of a second pair of said devices, an output circuit combining the output currents of the devices of said first pair of devices in phase opposition, an output circuit combining the output currents of the devices of said second pair of devices in phase opposition, a combining circuit coupled to both of said output circuits, direct current circuit means connected with a control electrode in each of said devices, direct current potential adjusting means in each circuit for adjusting the transconductance of each device of said first and second pairs of devices, and a uni-control means common to all of said adjusting means for relating said adjusting means whereby voltages of the desired phase may be obtained in said combining circuit by manipulation of said uni-control means.

3. In a system for adjusting the phase of single phase oscillating voltages, pairs of coupling tubes, means for applying said single phase oscillating voltages in phase to a pair of said coupling tubes, means for displacing the phase of said single phase oscillating voltages and applying the oscillations of displaced voltages in phase to a second pair of said coupling tubes, a voltage combining circuit wherein a single phase resultant is produced, coupled with all of the tubes of said pairs of coupling tubes, direct current biasing means connected to each tube for relatively varying the transconductance of the tubes of the pairs of coupling tubes to vary the amplitude of the outputs thereof and consequently vary the phase of the single phase resultant, and a single control means for all of said biasing means for relating said biasing means so that the amplitude of said resultant is substantially constant irrespective of its phase.

4. In a system for adjusting the phase of single phase oscillating voltages, pairs of coupling tubes, means for applying said single phase oscillating voltages in phase to a pair of said coupling tubes, means for displacing the phase of said single phase oscillating voltages and applying the voltages of displaced phases in phase to a second pair of said coupling tubes, a combining circuit coupling the outputs of said pairs of coupling tubes in series, direct current circuit means for each tube, direct current potential adjusting means in each direct current circuit for relatively varying the transconductance of the pairs of coupling tubes to vary the amplitude of the output of each tube and consequently vary the phase of the single phase resultant voltage in said combining circuit, and a uni-control means for all of said adjusting means.

5. In a system for producing alternating voltage of a substantially fixed phase which may be adjusted through a range of 360 degrees, pairs of electron discharge devices each having input electrodes and output electrodes, means for impressing alternating current of a first phase on the input electrodes of a first pair of said devices, means for impressing alternating current of a second and different phase on the input electrodes of a second pair of said devices, an output circuit combining the output currents of all of the devices, direct current circuit means connected with a control electrode in each of said devices, direct current potential adjusting means in each circuit for adjusting the transconductance of each device of said first and second pairs of devices, and a uni-control means common to all of said adjusting means for relating said adjusting means so that the square of the difference between the transconductances of the devices of said first pair of devices plus the square of the difference between the transconductances of the devices of said second pair of devices is a constant whereby voltages of the desired phase and of an amplitude which is substantially constant for all phases may be obtained in said combining circuit by manipulation of said uni-control means.

HAROLD O. PETERSON.